(12) United States Patent
Edmonds

(10) Patent No.: US 7,410,284 B2
(45) Date of Patent: *Aug. 12, 2008

(54) METHODS FOR PRODUCING THREE DIMENSIONAL, SELF-SUPPORTING, LIGHT REDIRECTING ROOF LIGHTING SYSTEMS

(76) Inventor: Ian Robert Edmonds, 12 Lentara Street, Kenmore, Brisbane, Queensland 4069 (AU)

( * ) Notice: Subject to any disclaimer, the term of this patent is extended or adjusted under 35 U.S.C. 154(b) by 852 days.

This patent is subject to a terminal disclaimer.

(21) Appl. No.: 10/785,480

(22) Filed: Feb. 25, 2004

(65) Prior Publication Data

US 2004/0200182 A1 Oct. 14, 2004

(30) Foreign Application Priority Data

Oct. 10, 2003 (AU) .............................. 2003252881

(51) Int. Cl.
*F21V 7/04* (2006.01)
*B26D 3/08* (2006.01)

(52) U.S. Cl. .......................... 362/600; 362/602; 52/200

(58) Field of Classification Search .................. 52/200, 52/72, 28, 173.3; 362/147, 275, 367, 360, 362/602; D25/52

See application file for complete search history.

(56) References Cited

U.S. PATENT DOCUMENTS

| | | | | |
|---|---|---|---|---|
| 4,989,952 A * | 2/1991 | Edmonds | .................... | 359/592 |
| 5,295,051 A * | 3/1994 | Cowling | ...................... | 362/576 |
| 5,880,886 A * | 3/1999 | Milner | ........................ | 359/599 |
| 6,311,446 B1 * | 11/2001 | Loyd | ............................. | 52/537 |
| 6,363,667 B2 * | 4/2002 | O'Neill | ....................... | 52/200 |
| 6,415,563 B2 * | 7/2002 | Rillie et al. | ................... | 52/200 |
| 7,070,314 B2 * | 7/2006 | Edmonds | .................... | 362/600 |
| 7,159,364 B2 * | 1/2007 | Rillie | .......................... | 52/200 |
| 7,222,461 B2 * | 5/2007 | Piano et al. | ...................... | 52/3 |
| 7,234,279 B2 * | 6/2007 | Sincic et al. | .................. | 52/200 |

\* cited by examiner

*Primary Examiner*—Richard E. Chilcot, Jr.
*Assistant Examiner*—Chi Q Nguyen

(57) ABSTRACT

A self-supporting roof lighting system that accepts low elevation light and rejects high elevation light may be produced by making arrays of parallel laser cuts through, or partly through, a flat sheet of transparent acrylic, cutting the segment containing the arrays from the sheet, positioning the segment over linear heating elements to soften the acrylic along the lines between adjoining laser cut arrays, folding the segment along the softened lines through the angle necessary to form a multi-faceted structure of saddle, pyramid or higher order form and allowing this structure to cool and solidify to produce a self-supporting angle-selective roof lighting system with an array of light redirecting laser cuts on each facet. The sequence of the method may be changed so that a saddle, pyramid or higher order structure is first formed by folding or moulding transparent acrylic and, subsequently, an array of parallel laser cuts is made in each facet of the structure to produce an angle-selective roof lighting system. A conical angle-selective roof lighting system may be produced by making concentric laser cuts through, or partly through, a disc of transparent acrylic with a segment cut out, softening the laser cut disc and moulding the disc into conical form.

10 Claims, 7 Drawing Sheets

METHODS FOR PRODUCING THREE DIMENSIONAL, SELF-SUPPORTING, LIGHT REDIRECTING ROOF LIGHTING SYSTEMS

BACKGROUND TO THE INVENTION

The basic form of roof lighting system comprises a substantially horizontal glazed input aperture in the roof, a substantially horizontal output aperture in the ceiling of the room below and a passageway with reflective interior walls that connects the two apertures. Natural light passing through the system provides natural illumination to the room below. This basic form of roof lighting system is ineffective in accepting and transmitting low elevation sunlight to the room below. The reasons for poor transmission of low elevation sunlight are: (a) The projected area of input aperture reduces as sin(E) where E is the sun elevation. (b) Low elevation sunlight suffers high reflection loss at the glazed input aperture. (c) Low elevation sunlight suffers many reflections within the reflective passageway and loses energy at each reflection. Thus natural illumination via roof lights tends to be poor in the early morning and late afternoon and in winter when the sun is at low elevation angle. Conversely, this basic form accepts and transmits high elevation light very effectively. However this may lead to overheating of the room below during the middle of the day in summer when the sun is at high elevation angle. It is therefore desirable to have a means of increasing the acceptance and transmittance of a roof lighting system when the sun elevation angle is low and a means of decreasing the acceptance and transmittance when the sun elevation is high. It is possible to use optical means for light redirection to alter the angular dependence of the acceptance and transmission of a roof lighting system. A roof light with optical means for light redirection is said to be angle-selective.

PRIOR ART

Angle-selective roof lighting systems for improved light distribution comprised of plates of light redirecting material in triangular and near conical form were described by Mueller, 92 DE-4225006 and 92DE-4225007. The light redirecting plates were holograms or diffraction gratings. The use of holographic or diffractive light redirecting plates is deficient in that holograms and diffraction gratings redirect light by interference and are therefore intrinsically dispersive producing a coloured effect to transmitted light. Also holograms and diffraction gratings produced photographically tend to degrade in sunlight. A method for producing light redirection panels by making laser cuts in transparent acrylic sheets was described by Edmonds U.S. Pat. No. 4,989,952. The material, called "laser cut panel", (LCP), is inexpensive and does not degrade in sunlight. The optical principles of this light redirecting material were described in Edmonds, "Performance of laser cut light deflecting panels in daylighting applications", Solar Energy Materials and Solar Cells, 29, 1-26 (1993). The theoretical principles and measured performance of angle-selective roof lighting systems based on laser cut panels was described by Edmonds et al. "Daylighting with angular selective skylights: Predicted performance", Lighting Research and Technology, 28(3) 122-130 (1996) and Edmonds et al "Daylighting enhancement with light pipes coupled to laser cut light deflecting panels" Lighting Research and Technology, 27(1) 27-35 (1995)). These publications described the improved natural lighting performance available from angle-selective roof light systems. A first objective of this invention is to provide an efficient method for producing an angle-selective roof light from laser cut light redirecting material.

Simple geometric configurations of laser cut panels can be designed to provide useful forms of angle-selective light transmission such that the light transmission of the system varies depending on the direction or angle of incidence of light on the system. Angle-selective light transmission can be used to enhance the performance of lighting systems, both electrical lighting systems and natural lighting systems. As an example of how light redirecting panels can improve a roof lighting system consider the system illustrated in FIG. 1. Here two laser cut light deflecting panels LCP 1 and LCP 2 are placed in a triangular or saddle configuration above a roof lighting aperture 3. Light ray 4 that would otherwise pass above aperture 3 is redirected by LCP 1 down through roof aperture 3 and transmitted into the building. This enhances the performance of the roof light for low angle light. Light ray 6 from directly above is redirected from LCP 1 across to LCP 2 and redirected by LCP 2 back out of the roof lighting system. This reduces the transmission of high angle light through the roof lighting system to the room below. This is useful to reduce overheating through roof lights near the middle of the day in summer. Laser cut light redirecting panels may also be formed into multi-faceted configurations such as pyramidal—as in FIG. 2—pentagonal, octagonal and so on. Such configurations also tend to enhance the transmission of low angle light while reducing the transmission of high angle light. In the design of electrical lighting systems the angle-selective system is placed below an electrical light source fitted in the ceiling to provide a more useful distribution of light from the light source. For example, the triangular or saddle configuration of angle-selective system illustrated in FIG. 1 may be placed in a V shaped configuration below a fluorescent light tube so that a fraction of the downwardly directed light from the fluorescent light tube is deflected sideways or upwards so as to produce a better distribution of light from the light source.

Currently, roof lighting systems for use in buildings are formed from separate panels of light redirecting material. Each separate panel is cut to the appropriate rectangular or triangular shape, and the panels are fixed together in the desired three-dimensional configuration by metal brackets or other fixing means so as to form an angle-selective lighting system. This method is cost effective for large roof lighting systems with apertures about one square metre or larger. However the cutting and assembly cost is prohibitive for smaller roof lighting systems of the type associated with light pipes and for light redirection systems for use with electrical lights such as light bulbs and fluorescent tubes. The technique of laser cutting with conventional automatic laser cutting machines is suited to the cutting of flat sheets of material. Thus it is not immediately evident how a three-dimensional light redirecting system might be produced without cutting flat panels and fixing the panels together to form the required structure. It is therefore a second objective of this invention to provide a method for producing a self-supporting, three-dimensional structure of laser cut light redirecting material. The three dimensional structure may be of saddle, pyramidal, or multi-faceted three-dimensional form suited to angle-selective light acceptance and transmission in roof lighting systems.

Small roof lighting systems commonly use a cylindrical reflective passageway between a circular roof aperture and a circular ceiling aperture. Similarly, small electrical lighting systems are often circular in form. A conical angle-selective lighting system would be the desired form to be associated with a circular light pipe or circular light fitting with the circular base of the cone of substantially the same radius as the light pipe or light fitting. The technique of laser cutting with conventional automatic laser cutting machines is suited to the cutting of flat sheets of material. Thus it is not immediately evident how a conical light redirecting system might be produced. It is therefore a third objective of this invention to provide a method for producing a self-supporting, conical structure of laser cut light redirecting material suited to angle selective light acceptance and transmission in circular or cylindrical roof lighting systems.

SUMMARY OF THE INVENTION

The first method of this invention is to use a laser cutting machine to cut a pattern arrays of parallel laser cuts through or partly through a single flat panel of transparent acrylic. Each array of laser cuts in the flat panel is associated with a facet of the desired geometrical configuration of the angle-selective roof lighting system and each array of laser cuts is separated from neighbouring arrays by a narrow strip of transparent acrylic left uncut and solid. One of the solid strips of acrylic separating two of the laser cut arrays in the resulting flat sheet is then softened by heating. The flat sheet is then folded through the appropriate angle along the line between the two laser cut arrays and allowed to cool to below the softening temperature. This results in a rigid joint between two adjoining facets of the desired geometrical configuration with each facet containing an array of parallel laser cuts. The procedure of softening, folding and cooling is repeated for each narrow strip between the facets until a self-supporting three-dimensional structure of the required form is obtained.

In the second method of this invention a flat panel of transparent acrylic plastic is cut and shaped by folding or by moulding into a multifaceted self-supporting structure. Arrays of parallel laser cuts are then made through or partly through each facet of the structure so that each facet of the structure acquires a light redirecting capability.

In the third method of this invention a flat panel of transparent acrylic is cut to the shape of a disc with a segment removed. Laser cuts are made in a concentric circular pattern through or partly through the disc. The disc is then heated to softening temperature of the acrylic, moulded into conical form between metal moulds and then allowed to cool and solidify.

DETAILED DESCRIPTION OF THE INVENTION.

Figure 1:
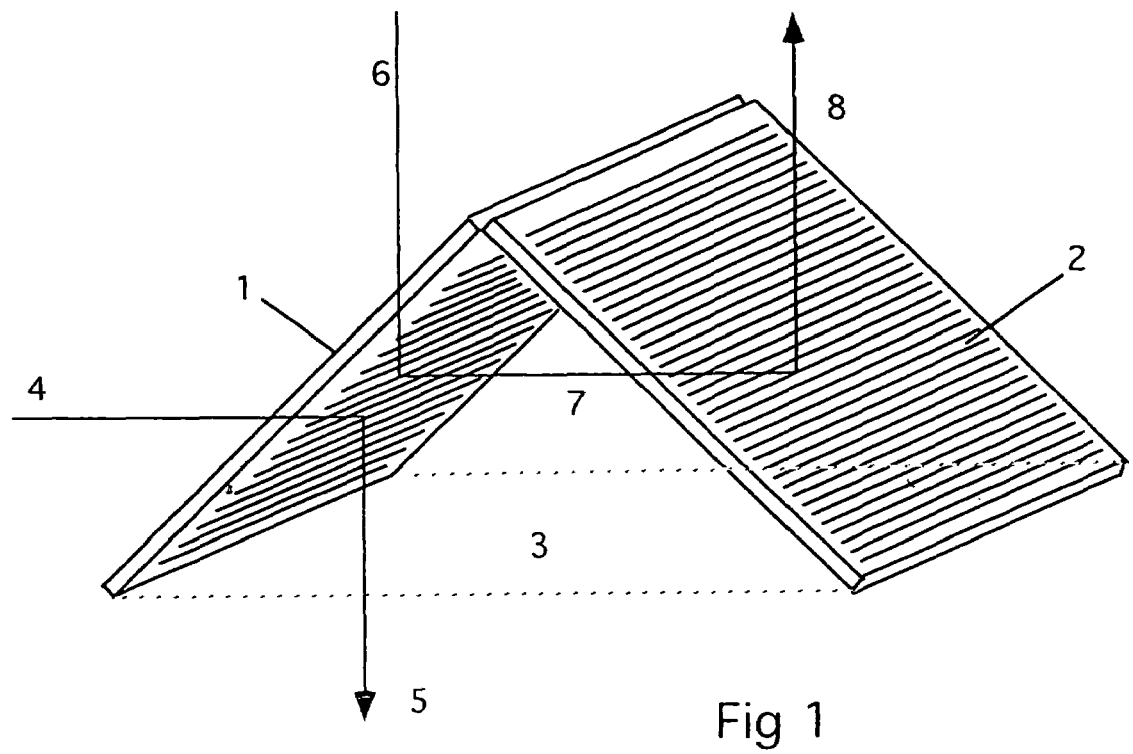
FIG. 1. Illustrates how two laser cut light deflecting panels may be placed in a saddle configuration above a roof aperture to provide a roof lighting system with an angle selective light function accepting low angle light and rejecting high angle light.
Figure 2:
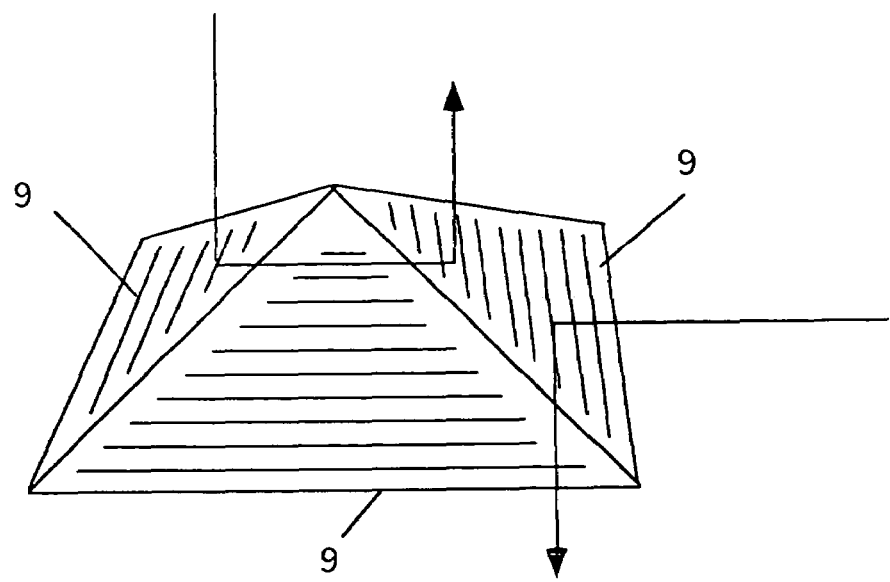
FIG. 2. Illustrates how four laser cut light deflecting panels may be placed in a pyramidal configuration above a roof aperture to provide a roof lighting system with an angle selective light function accepting low angle light and rejecting high angle light.
Figure 3:
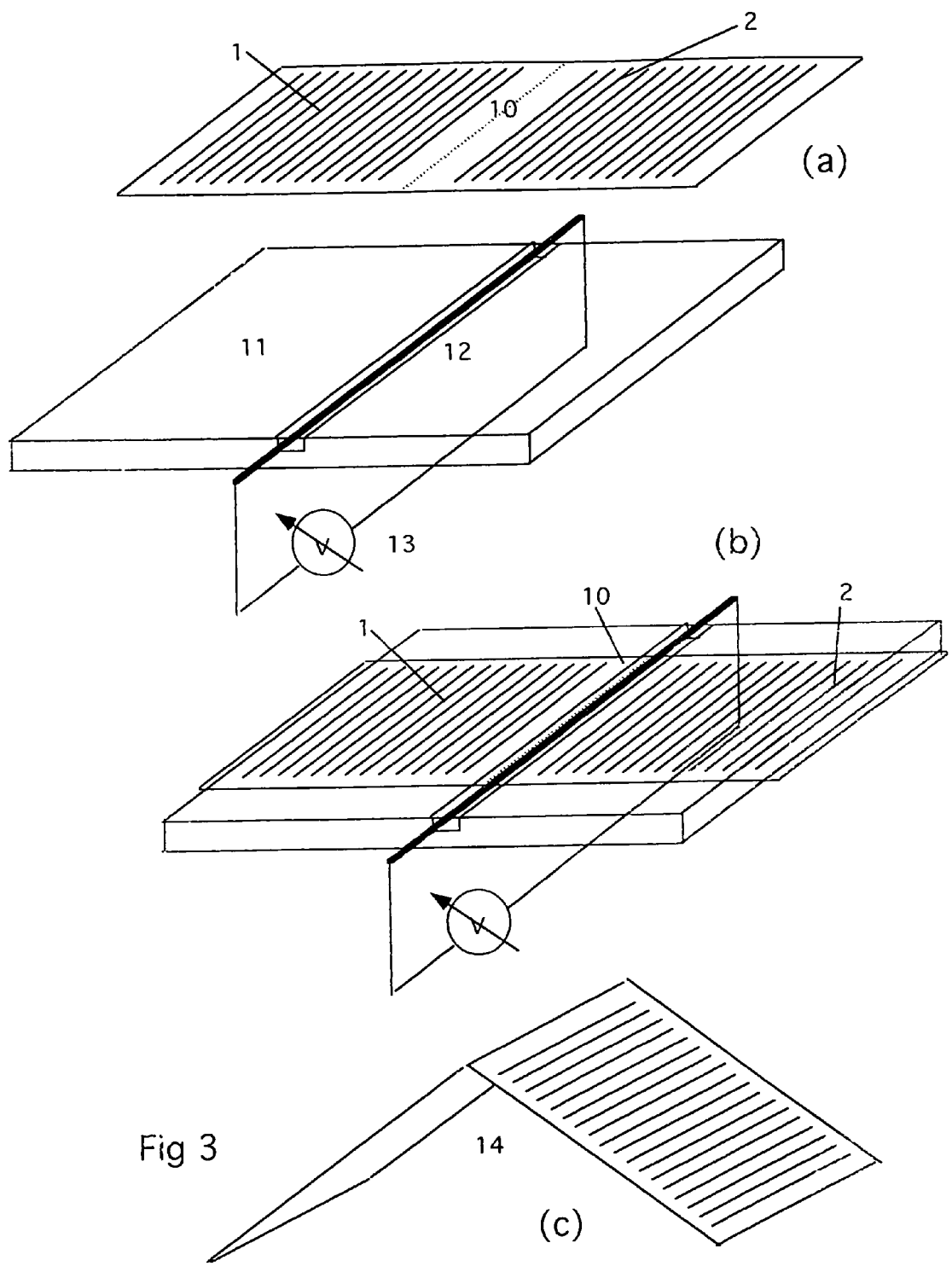
FIG. 3. Illustrates the first method of this invention for producing a saddle form of angle-selective roof lighting system by making two arrays of parallel laser cuts in a flat panel of clear acrylic plastic, softening the narrow clear plastic strip between the arrays with a strip heating element, folding the panel along the softened strip and allowing the fold to cool and solidify so as to form a self-supporting angle-selective roof lighting system.

The first method of this invention is illustrated by the method for producing the simplest geometrical form of angle selective roof lighting system, that is, a saddle form of angle-selective lighting system. The method is described with reference to FIG. 3. FIG. 3 (a) shows a flat rectangular transparent acrylic sheet with two arrays of parallel laser cuts 1 and 2 made through two sections of the flat sheet. A narrow strip of solid plastic 10 is left between the two arrays of laser cuts 1 and 2. The laser cuts may penetrate right through the sheet, or, may be cut partly through the sheet so that one side of the sheet remains solid. Typical depth of the laser cuts would be 6 mm and the typical spacing between each laser cut in each array of parallel cuts would be in the range 3 mm to 4 mm. If the 6 mm deep cuts were made partly through a 10 mm thick sheet of acrylic then 4 mm of the sheet would remain solid and would provide one solid, non-permeable surface to the laser cut sheet. The laser cuts would usually be made normal to the surface of the panel. However, the laser cuts may be made at a small angle to the normal to the acrylic sheet in cases where angled cuts would improve the angle-selective performance of the system. The flat acrylic sheet with the two arrays of cuts is then placed on a table 11 that has a narrow linear heating element 12 incorporated in a slot in the table 11. The heating element is powered by a variable electric power source 13. There may be pipes containing water coolant running on either side of heating element 12 to narrow the width of the strip of acrylic sheet being heated and softened. The flat acrylic sheet is placed on the table above heating element 12 such that the narrow solid strip 10 between the laser cut arrays is heated to the softening temperature of the acrylic. One section of the flat sheet is then folded upwards through the required angle and the folded joint is allowed to cool until solid. This results in a self-supporting rigid three-dimensional structure of saddle form as in FIG. 3 C. If the cuts were made partly through the sheet the resulting rigid three-dimensional structure would have one surface solid and impermeable. Such a solid, impermeable surface would provide for water proofing and dust proofing of the three-dimensional angle-selective system.

Figure 4:
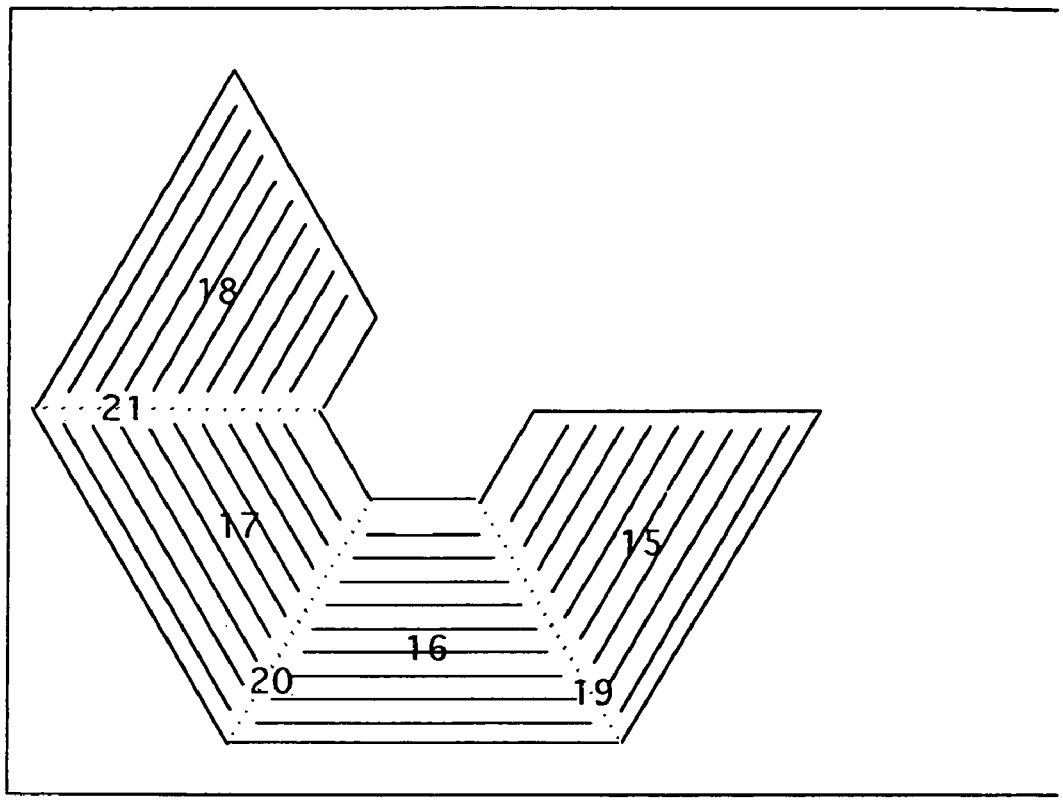
FIG. 4. Illustrates a typical pattern of the arrays of parallel laser cuts to be made in a transparent acrylic sheet and the pattern of the segment to be cut from the acrylic sheet prior to softening the regions of the segment along the lines between the arrays, and folding and cooling so as to form an angle-selective roof lighting system of pyramid form.
Figure 5:
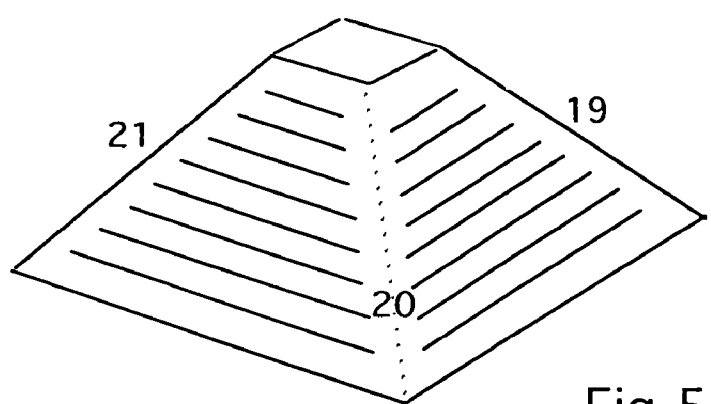
FIG. 5. A schematic view of the pyramid form of self-supporting angle-selective lighting system obtained by folding the segment acrylic sheet shown in FIG. 4 along the lines between the arrays of parallel laser cuts made in the segment illustrated in FIG. 4.

The application of the method of this invention to the production of a self-supporting angle-selective lighting system of pyramid form is now described with reference to FIG. 4 and FIG. 5. FIG. 4 shows the typical pattern of the segment to be cut from a flat acrylic sheet in order to form a pyramidal angle selective lighting system. Arrays of parallel laser cuts 15, 16, 17 and 18 are cut in adjoining regions of the segment with an automatic laser cutting machine, the cuts extending partly or right through the sheet. The resulting segment is then removed from the sheet and placed on a table fitted with a narrow linear heating element as in FIG. 3 and softened, folded and cooled sequentially at lines 19, 20 and 21 between the individual laser cut arrays resulting in the self-supporting pyramidal structure illustrated schematically in FIG. 5. When the laser cuts are made partly through the clear acrylic sheet the external surface of the resulting three-dimensional structure is solid and impermeable. By adding a square impermeable cap to the three-dimensional structure illustrated in FIG. 5 the resulting roof lighting system may be made impermeable to water.

When many roof lighting systems of the types described are to be produced the production rate by the method of this invention may be increased by having multiple line heating elements fixed in a table in the desired configuration such that each line of the between adjoining facets could be heated to the softening temperature simultaneously. Subsequent folding would be made simultaneously by folding the segment into or over a mould of the appropriate shape.

In the second method of this invention the sequence of the steps described in the first method is changed. The flat acrylic sheet is cut and folded, or cut and moulded, to the required three-dimensional form before the laser cuts are made in the acrylic material. Making laser cuts in a three dimensional structure is much more complicated than making laser cuts in a flat sheet. Specialised laser cutting machines with laser cutting heads rotatable through three dimensions are available. Such machines could be used to place arrays of laser cuts in the separate facets of the three dimensional structure while the structure is held in a fixed position and the laser cutting head rotates and moves to make an array of parallel cuts in each facet of the structure. However, commonly available laser cutting machines are suited to cut only in flat sheets of material. For laser cutting with such machines the three-dimensional acrylic form may be placed in a rotatable jig such that each individual facet of the three-dimensional structure can be rotated to lie horizontally below the laser cutting head. An array of parallel laser cuts is made in the horizontal facet and then the jig is rotated to bring the next facet to horizontal position below the laser cutting head. This sequence of cutting and rotating the piece is repeated until all facets in the three dimensional structure have been laser cut.

When multi-faceted structures are made by folding a flat segment the resulting self-supporting structure has two adjoining edges that are not solidly joined together. Provided the acrylic material of the structure is of reasonable thickness, for example 6 mm, and the spatial extent of the facets is not too large, for example less than 1 m wide, then the structure so formed is stable and self supporting. However, it may be desirable to join the two edges with acrylic adhesive or some other means in order to maximise structural stability and strength.

Figure 6:
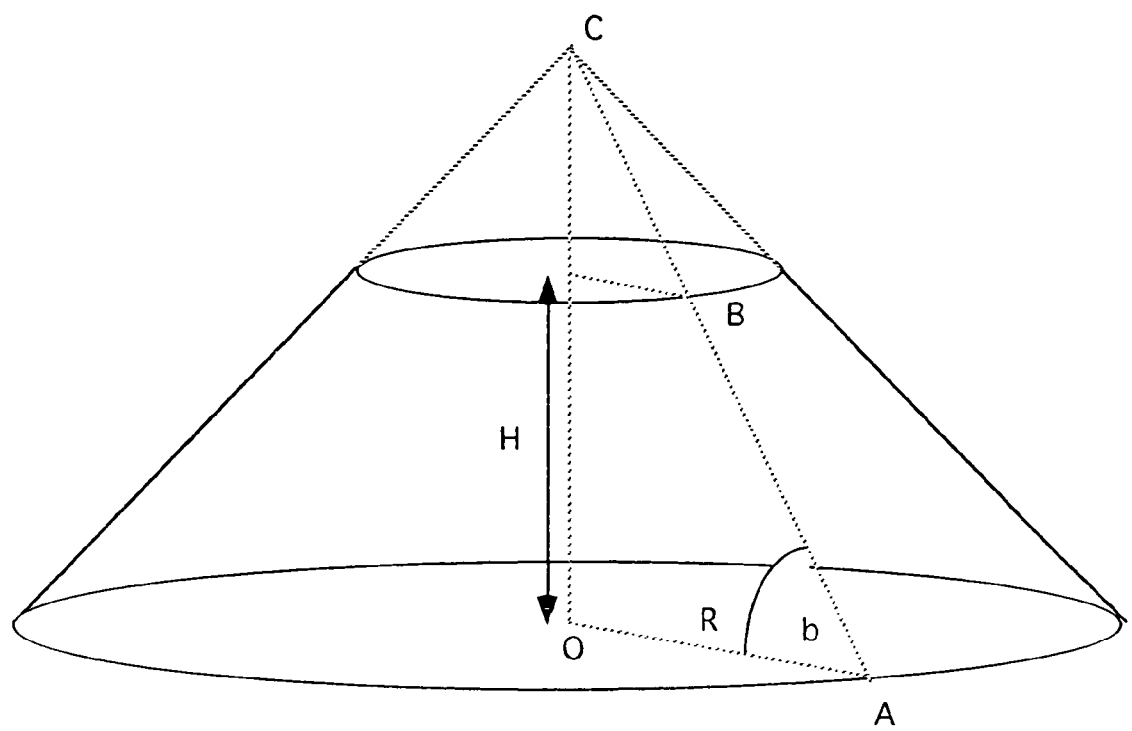
FIG. 6. The geometric parameters relating to a truncated cone of slope angle, b, height, H, and base radius, R.
Figure 7:
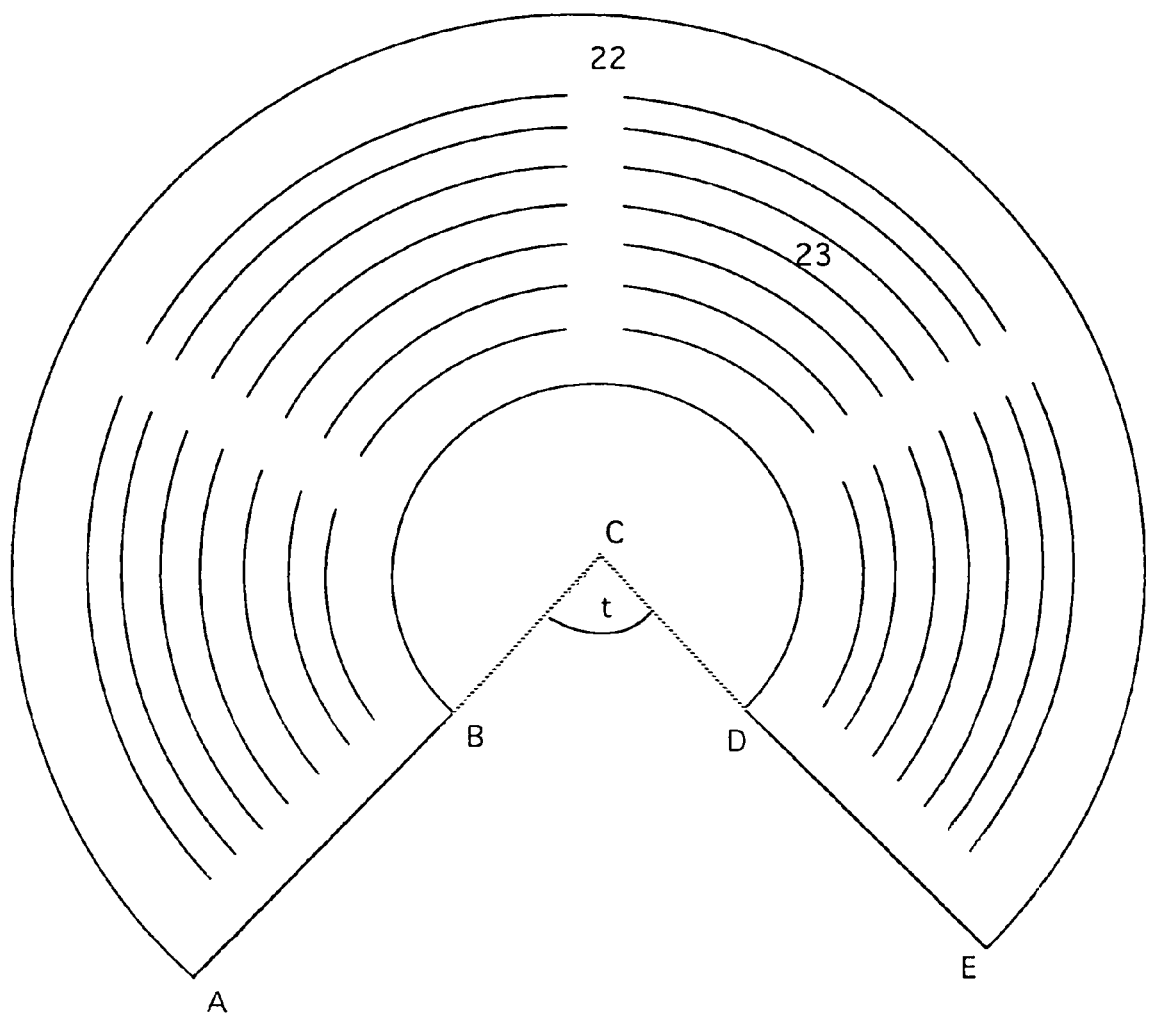
FIG. 7. The geometric parameters of a planar sheet of transparent acrylic material with laser cuts in concentric circular form that may be moulded into the form of a truncated cone.

The third method of this invention produces a conical light redirecting system. The desired conical form, as illustrated in FIG. 6, is defined by a base radius R, (designed to be substantially the same radius as the radius of the light pipe or circular skylight aperture to which the conical light redirecting system is to be mated), the slope angle, b, of the conical laser cut surface and the height, H, between the base section and the top section of the conical surface. The conical surface of FIG. 6 may be produced by deforming a disc with a segment of angle t cut out as illustrated in FIG. 7. The disc 22 is defined by an inner concentric circle of radius CB and an outer concentric circle of radius CA. From FIG. 6, $CA=R/\cos(b)$, $AB=H/\sin(b)$ and $CB=R/\cos(b)-H/\sin(b)$. The required angle t between the two edges of the disc 22 which, on deformation of the disc, join to make a conical surface is given by $t=360(1-\cos(b))$. A series of laser cuts in the form of circular arcs 23 are made through or partly through the disc 22 in a pattern similar to that illustrated in FIG. 7. The radial spacing of the laser cuts is made to obtain a specified cut spacing to the cut depth ratio. If the cut spacing to cut depth ratio is in the range 0.4 to 0.7 a high ratio of light incident from low elvations incident on the conical system will be redirected. For example, the cut spacing to cut depth ratio $2/3=0.667$ may be obtained by making concentric laser cuts at a radial spacing between cuts of 4 mm and by making the laser cuts to a depth of 6 mm in a 10 mm thick sheet of transparent acrylic. When the cuts are made partly through the planar sheet one surface of the resulting disc 22 is impermeable. Thus, when the disc is moulded to conical form the outer surface of the conical light redirecting system is impermeable and waterproof. In this case the conical light redirecting system of this invention may be utilised as a waterproof cover for the roof aperture of a light pipe or a skylight in addition to the light redirecting function. When the laser cuts are made right through the flat sheet, for example cuts at 4 mm radial spacing right through a 6 mm thick sheet, solid regions which extend radially outwards and solid regions at the inner edge and outer edge of the cut surface are left to retain the laser cut sections in place as illustrated by the pattern shown in FIG. 7. These solid sections provide structural stability when the surface is moulded into the required conical form.

Figure 8:
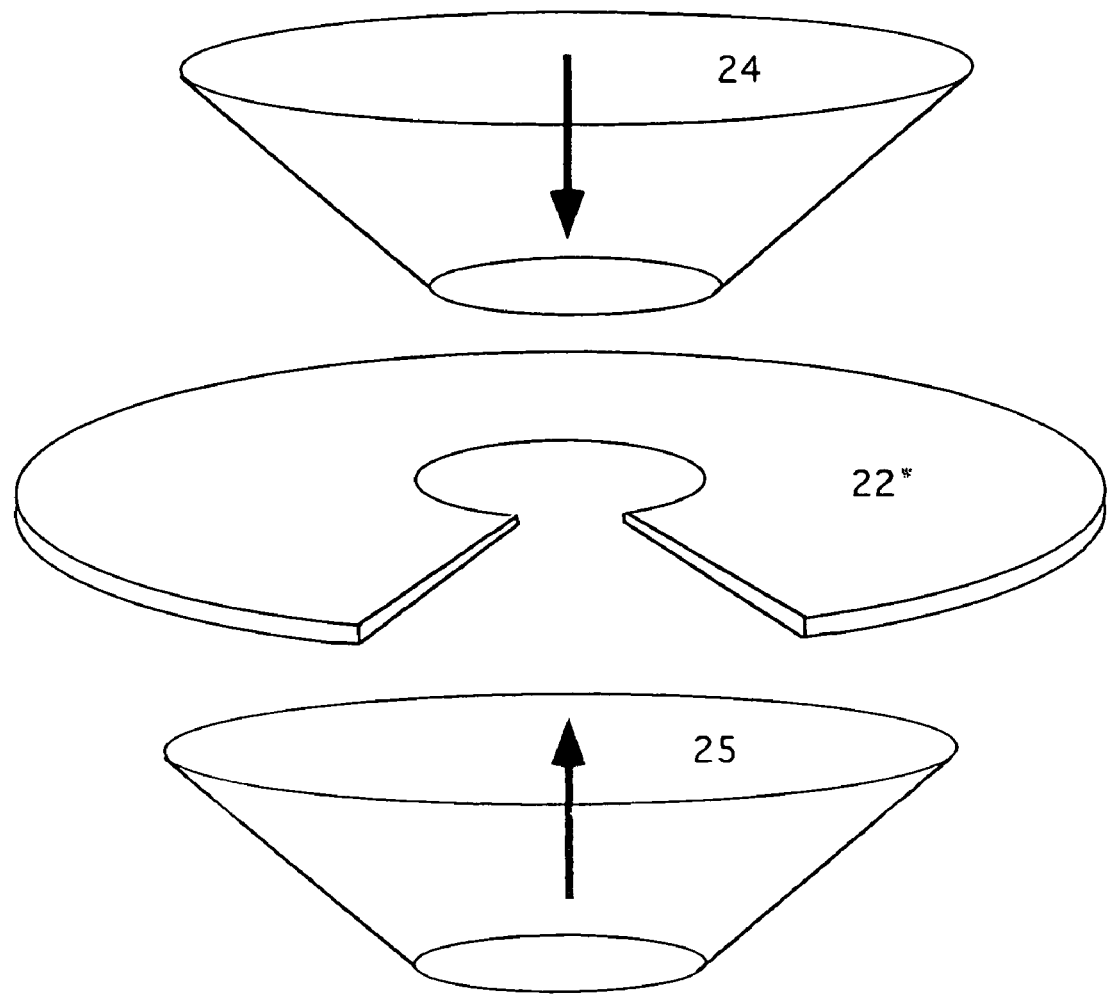
FIG. 8. Illustrates the method by which a segment of a planar sheet of laser cut material that has been heated to the softening temperature may be moulded into a conical form by clamping between two conical moulds.

The laser cut disc as described above and illustrated in FIG. 7 is now raised to the softening temperature of the acrylic and clamped between two moulds 24 and 25 of the required conical form as illustrated in FIG. 8. The moulds may be formed from steel sheet or similar material. With the laser cut panel clamped between the moulds the assembly is heated to slightly above the softening temperature of acrylic, (110 C), to remove residual elastic stress in the panel. The mould assembly is then cooled to room temperature and the conical light redirecting system removed from the mould. When formed from material thicker than 3 mm the conical structure is self-supporting. However, for material of thickness 3 mm or less it is desirable to join the two open edges (edge AB and edge DE in FIG. 7) with acrylic adhesive or other means to improve structural stability.

It is expected that this method of producing a conical laser cut light redirecting system would be relatively easy to mechanise. For example a large number of laser cut discs cut to the form of FIG. 7 could be preheated to close to the softening temperature then individually clamped between moulds. The moulds on clamping together, as illustrated in FIG. 8, would form the disc into conical form. Cooling of the assembly would cool the conical form to a temperature at which the conical shape is retained, at which time it would be released from the mould.

Figure 9:
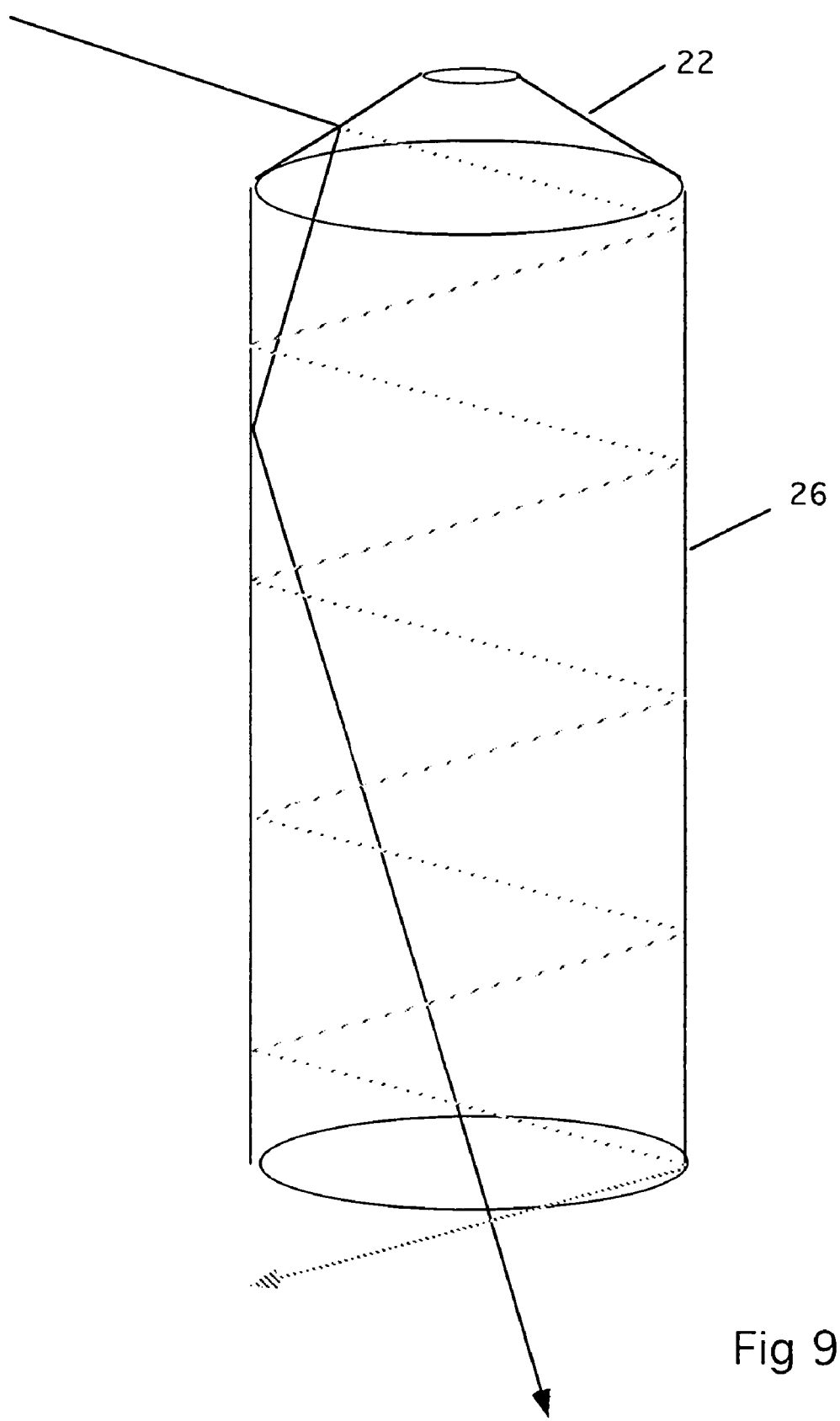
FIG. 9 illustrates the increased natural lighting performance obtained when a conical angle selective light redirecting system is used with a vertical reflective light pipe.

FIG. 9 illustrates the increased natural lighting performance obtained when a conical angle selective light redirecting system 22 is used with a vertical reflective light pipe 26. The improved performance is due to increased acceptance of low elevation sunlight and to increased transmission of low elevation sunlight through the system. The increased acceptance of low elevation sunlight is the result of the light redirecting system extending above the input aperture of the pipe. The increased transmission through the system at low sun angles is the result of the redirection of accepted sunlight more directly down the pipe. This reduces the number of reflection losses incurred by the light in traversing the pipe and, as a result, the light transmission is increased.

Those modifications and equivalents which fall within the spirit of the invention are to be considered a part thereof.

I claim:

1. A method for producing a multifaceted, self-supporting, angle-selective light redirecting system comprising:
    (a) laser cutting two or more arrays of parallel laser cuts through or partly through a flat sheet of transparent acrylic plastic with narrow strips of solid transparent acrylic plastic being left uncut between adjoining arrays of laser cuts, said arrays of parallel laser cuts covering a segment of said flat sheet in a pattern such that removal of said segment of flat sheet and folding of said segment of flat sheet along lines of the narrow solid strips between each array of parallel laser cuts in the segment would result in a multifaceted, three dimensional structure of saddle, pyramidal or higher order form;
    (b) cutting and removing said segment out of said flat sheet;
    (c) positioning said segment on a table such that one of the narrow strips of solid clear plastic between the arrays of laser cuts is aligned directly above a narrow linear heating element slotted into a surface of said table;
    (d) applying electrical power to raise a temperature of said linear heating element such that the narrow strip of solid plastic between adjoining arrays of laser cuts in said segment is heated and softened;
    (e) folding said segment along one of the lines of the narrow strip which has been softened though an angle suited to form the three dimensional structure then allowing the narrow strip of plastic to cool and solidify;
    (f) repeating steps (c), (d) and (e) for each narrow strip of solid plastic between adjoining arrays of laser cuts so as to form a multi-faceted, three dimensional, self supporting angle-selective roof lighting system with each facet of the system having an array of laser cuts through or partly through the facet.

2. A method for producing a multifaceted, three dimensional, self-supporting, angle-selective lighting system comprising:
    (a) laser culling two or more arrays of parallel laser cuts though or partly though a flat sheet of transparent acrylic plastic with narrow strips of solid transparent acrylic plastic being left uncut between adjoining arrays of laser cuts, said arrays of parallel laser cuts covering a segment of said flat sheet in a pattern such that removal of said segment of flat sheet and folding of said segment of flat sheet along lines of the narrow solid strips between each array of fine parallel cuts in the segment would result in a multifaceted, three dimensional structure of saddle, pyramidal or higher order form; in the case of a saddle form each of the two facets being of rectangular form and in the case of a pyramid or higher order form each facet being of triangular form with a base and a peak; said arrays of parallel laser cuts being made parallel to the base of the facets;
    (b) cutting and removing said segment out of said flat sheet;
    (c) positioning said segment on a table such that each individual narrow strip of solid clear plastic between the arrays of laser cuts is aligned directly above one narrow linear heating element of a group of narrow heating elements slotted into a surface of said table;
    (d) applying electrical power to raise a temperature of said linear heating elements such that the narrow strips of solid plastic between adjoining arrays of cuts in said segment are heated and softened;
    (e) folding said segment along the lines of the narrow strips which have been softened though an angle suited to form the three dimensional structure then allowing the narrow strips of plastic to cool and solidify so as to form a multi-faceted, self-supporting, angle-selective roof lighting system with each facet of the system containing an array of parallel laser cuts through or partly through the facet.

3. A method for producing a multifaceted, three-dimensional, self-supporting angle-selective light redirecting system comprising:
    cutting a segment from a flat transparent sheet of acrylic and folding or moulding said segment of acrylic so as to form a multifaceted, three-dimensional self-supporting structure of saddle, pyramidal or higher order form; in the ease of a saddle form, each of the two facets being of rectangular form and in a case of a pyramid or a higher order form, each facet being of triangular form with a base and a peak;
    cutting an array of parallel laser cuts in each individual facet of said three dimensional structure with a laser cutting machine, said laser cuts being made parallel to the base of the individual facets forming said structure and said arrays of laser cuts being made through or partly through each individual facet of the three dimensional structure such that each facet of said structure acquires a light redirecting property.

4. A method for producing a three-dimensional light redirecting system comprising:
    cutting from a flat sheet of transparent acrylic material a disc having an inner edge and an outer edge, said disc having two radial edges defined by a segment cut from said disc such that on deformation of said disc into a three-dimensional form the radial edges would join;
    making a series of laser cuts about a centre of said disc, said laser cuts being made through or partly through said disc at a radial spacing between the laser cuts and at a cut depth such that the ratio of radial spacing of laser cut to the depth of laser cut is substantially in the range 0.4 to 0.7;
    softening said disc by heating and deformation of said disc into by compression between two three-dimensional moulds;
    cooling the moulds and said acrylic material to below the softening temperature of said acrylic material and removing the cooled and solid three-dimensional acrylic material from the moulds; and
    joining the radial edges of said laser cut acrylic material.

5. The method for producing the three-dimensional light redirecting system as defined in claim 4, wherein said three-dimensional light redirecting system is conical in shape.

6. The method for producing the conical light redirecting system as defined in claim 5, wherein said inner edge is defined by a smaller inner radius about said centre and said outer edge is defined by a larger outer radius about the same centre, said radial edges of said disc are defined by said segment cut from said disc such that on deformation of said disc into conical form the radial edges would join to form a truncated cone.

7. The method for producing the conical light redirecting system as defined in claim 4, wherein said series of laser cuts in said disc are concentric cuts made about the centre of said disc.

8. The method for producing the conical light redirecting system as defined in claim 7, wherein said disc is deformed into a conical form by compression between two conically shaped moulds.

9. The method for producing the conical light redirecting system as defined in claim 8, wherein said conical light redirecting system removed from said conically shaped moulds is in the form of a solid truncated cone.

10. The method for producing the conical light redirecting system as defined in claim 9, wherein said radial edges of said laser cut truncated cone are joined with acrylic adhesive or other means.

* * * * *